United States Patent
Bellamy et al.

(10) Patent No.: US 6,944,655 B1
(45) Date of Patent: Sep. 13, 2005

(54) USER-DEFINED ONLINE INTERACTION METHOD AND DEVICE

(75) Inventors: Rachel K.E. Bellamy, Bedford, NY (US); Jason B. Ellis, Atlanta, GA (US); Thomas D. Erickson, Minneapolis, MN (US); Wendy A. Kellogg, Yorktown Heights, NY (US); Mark R. Laff, Mount Kisco, NY (US); Peter K. Malkin, Arsdley, NY (US); John T. Richards, Chappaqua, NY (US); Philip S. Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/541,804

(22) Filed: Apr. 3, 2000

(51) Int. Cl.[7] .......................................... G06F 15/173
(52) U.S. Cl. .................. 709/223; 709/223; 709/224; 709/227; 709/228; 370/245; 370/241; 715/535
(58) Field of Search ................................. 709/223, 224, 709/227, 228, 204, 203; 715/535; 345/11

(56) References Cited

U.S. PATENT DOCUMENTS

| | | | | |
|---|---|---|---|---|
| 5,945,988 A | * | 8/1999 | Williams et al. | 345/327 |
| 6,295,057 B1 | * | 9/2001 | Rosin et al. | 345/335 |
| 2002/0016848 A1 | * | 2/2002 | Yoshimine et al. | 709/231 |

* cited by examiner

*Primary Examiner*—Valencia Martin-Wallace
*Assistant Examiner*—Adnan Mirza
(74) *Attorney, Agent, or Firm*—Louis P. Herzberg; F.Chau & Associates, LLC

(57) ABSTRACT

The present invention provides a method, system and apparatus enabling user-defined, genre-structured interaction online. The present invention enables users to define their own genres, including rules of interaction, as well as rules of enforcement. Genre definitions also can include the specification of roles, parameters, and states. The present invention also facilitates a given user to modify a given genre definition. Allowable modifications include addition, modification, and deletion of parameters and interaction and enforcement rules. The present invention also provides dynamically updated graphical representations of the state of genre instances, these graphical representations definable by the users.

31 Claims, 12 Drawing Sheets

USER-DEFINED ONLINE INTERACTION METHOD AND DEVICE

BACKGROUND OF THE INVENTION

1. Field of the Invention

The present invention is related to a device and method for online user interaction; particularly, a device and method for facilitating user-defined structured forms of online conversation.

2. Discussion of Related Art

Despite the continued explosive growth in the popularity and use of the Internet, support for social interaction in online communities remains limited and primitive. In particular, no online support is available for structured styles of interactions (genres) online, which can be defined by, and modified by the end-users—even during usage; and which enable user-defined rules of enforcement.

To better understand genres, consider the following example of a structured interaction. In a lecture concerned with computer-mediated communication, there is a speaker and an audience of spectators. When the lecture begins—somehow signaled by the speaker—all spectators fall silent to listen to the speaker present her lecture. Assuming that all questions are to be held to the end of the lecture, the speaker is never interrupted. Once the speaker has finished her presentation—another event somehow signaled by the speaker—spectators are able to ask questions. To do so, a given spectator must raise his hand and wait to be called upon by the speaker; no talking out of turn is allowed. Once a given spectator is selected by the speaker, he can ask his question, the content and presentation of which should be short. Once asked, the speaker responds to the question, the presentation here being arbitrarily long. Following her answer, the speaker, then either accepts another question, or ends the lecture. Note that the roles present in this lecture interaction include: the speaker (one particular user), one or more spectators (the other active users), and, when selected, a questioner (one of the spectators, one who "raised his hand" and as then been called upon by the speaker). Note also how the "speaker" and "spectators" always refer to the same particular individuals, while the "questioner" changes, often being undefined (i.e., when no one is asking a question). If a spectator was to shout out a question at an inappropriate time, the speaker could merely chide the offending spectator, telling him to wait for the question section, or, if the spectator was truly abusive, the speaker could have the offending spectator removed from the premises.

For further detail on genres, see Thomas Erickson "Social Interaction on the Net: Virtual Community as Participatory Genre," accessible via URL: http://www.pliant.org/personal/Tom_Erickson/VC_as_Genre.html. Examples of online interaction facilities follow:

FTP allows online users "anonymous"—to have access to a collection of documents; one or more users being authorized to add documents to the collection. No other styles of interaction are definable by the users. (See Ed Krol, *The Whole Internet Catalog*. O'Reilly and Associates, Inc. Sebastopol, Calif. 1992 for details).

NNTP or network news, provides a venue in which users can asynchronously post messages and responses into administered news groups (i.e., predefined groups of messages which are meant to relate to specified topic, e.g., all articles in alt.sport.soccer should deal with soccer). Only loosely structured forms of interaction are provided, e.g., query-and-respond, which are not then enforced. No other styles of interaction are user definable.

Internet Relay Chat (IRC) is similar to NNTP in that it allows users to post messages and responses to each other in predefined topic areas—called channels in IRC. The main difference with IRC is that the interactions are synchronous rather than asynchronous as in NNTP. Just as with NNTP, IRC does not enable users to define structured forms of interaction which include rules of enforcement.

Loom, a visualization tool for Usenet (NNTP) news groups, provides a technique for displaying the emotional mood (e.g., hostile, happy) of an NNTP-based online community (e.g., a Usenet newsgroup) by analyzing the content of its interactions. Although this utility can analyze online interactions and provide a graphical representation of aspects of the interactions, it does not provide a way for users to define structured styles of interaction. (See Judith Donath et al. "Visualizing Conversation" published in the Journal of Computer Mediated Conversation. Volume 4, number 4, June 1999)

Babble provides dynamic indicators of the presence and activity of all operational users with respect to the available topics (i.e., discussion areas created by the users). These indicators are computed using the activities of the participants (e.g., connections, postings and topic switches). Although lightly structured styles of interaction are frequently adopted (e.g., interaction in the "—Commons Area—" is informal conversation, while interaction in the "Babble Problems" topic consists of serious question/answer dialogs), no way is provided for users to formally specify structured styles of interaction and then have them enforced. (See Thomas Erickson, et al. "Socially Translucent Systems: Social Proxies, Persistent Conversation, and the Design of 'Babble.'" published in *Human Factors in Computing Systems: The Proceedings of CHI '99.* ACM Press, 1999.)

Online games, like chess and bridge (e.g., Chessmaster 6000 by Mindscape, Inc.), provide structured and enforced styles of interaction, but not ones that (1) can be defined by the users, the rules all being predefined; (2) that can have the rules changed by the users during a game (e.g., "A queen can leap from anywhere to anywhere"); and (3) that include user defined rules of enforcement.

Coordinator, a method of structuring human communications, provides an electronic mail-based system that allows users to structure conversations and track tasks. For example, a typical interaction begins with a "Request" message from person A to person B, requesting something from person B by a certain date. This e-mail note asks Person B to respond with a "Promise" message (promising to perform the action), with a "Decline" message (declining to perform the action), or with a "Counteroffer" message (offering to perform the action by a different date or to perform a different action). If B promises to do the action, then a typical conversation might continue with B, eventually sending a "Report completion" message (indicating that the action has been performed) and A replying with a "Close" message (indicating that the action was performed satisfactorily). (See: Flores et al. "Method and Apparatus for Structuring and Managing Human Communications By Explicitly Defining the Types of Communications Permitted Between Participants." U.S. Pat. No. 5,208,748 May, 4, 1993.)

The Oval implementation of Coordinator extends the base functionality by allowing end-users to modify interaction rules mid interaction (see Malone et al. "Experiments with Oval: A Radically Tailorable Tool for Cooperative Work" via URL http://ccs.mit.edu/papers/CCSWP181/index.html#4b).

Thus Coordinator, implemented with Oval allows users to define and maintain structured styles of online interaction. Users are still unable to (1) provide rules of enforcement; (2) switch from one user-defined genre to another during a given interaction (e.g., reassign the roles of the participants); and (3) handle interactions where messages are posted to a group of recipients, all of whom are not known a priori (e.g., as is the case in an online lecture where the speaker broadcasts his speech to whomever is listening). Coordinator/Oval does allow users to specify rules specifying the graphic/iconic representation of the state of their conversations, initial, as well as the for the effect of rule violations (e.g., a particular change in the color of interrupter's icon).

Thus, there exists a need for a method and apparatus enabling user-defined structured styles of interaction (genres) online which includes rules of enforcement. A need also exists for a method enabling users to modify and/or replace a given genre during use. And, a need exists for dynamically updated genre state indicators (graphical representations) whose graphic behaviors are defined by the end-users.

SUMMARY OF THE INVENTION

In accordance with the aforementioned needs, the present invention is directed to a method, system and apparatus enabling user-defined structured styles of interaction, genres, online. The present invention enables users to define their own genres, (such as a debate genre in which users can participate in a formal debate online), including rules of interaction, which specify what users of a given genre can do and when, as well as rules of enforcement, which specify what users are not supposed to do, when, and what happens when they break the rules. Genre definitions also can include the specification of roles (e.g., the speaker in a lecture genre); parameters (e.g., Max_Post_Length, the maximum allowable length of each posting); and states (e.g., the Presentation_period in a lecture genre). Genres can be created from scratch, or by first retrieving a previously defined genre (e.g., "Basic Lecture"), modifying it (e.g., adding rules), and then saving it under a new name (e.g., "6th-Grader Lecture"). The present invention also allows users to modify and delete these genre definitions off-line, i.e., when no instances are in use.

The present invention allows users to modify the rules of a given genre while they are using an instance of it. For example, if users of a debate genre find that the maximum allowable length of postings is too short, they can increase this value. Users can also add rules, such as to allow users of a lecture genre request clarifications at any time, even during the speaker's formal presentation period. Users are able to have these changes saved to permanently change the given genre's definition.

Further, a user can change the genre of an instance in which they are participating while they are participating. For example, if the speaker of an instance of a lecture genre finds that the question and answer period is centered around a single contentious point, she could change the genre of the instance from lecture to debate.

The present invention also provides dynamically updated graphical representations of the state of genre instances. These graphical representations show both who is doing what (e.g., the user represented by the yellow dot is asking a question); as well as what particular users should be doing (e.g., providing an indication of whose turn it is to speak in a debate genre). Methods are also provided to show when a user violates one or more rules (e.g., indicating who has spoken out of turn). These indicators can also provide action history (e.g., the interruption indicator for a given user growing larger each time the given user interrupts). Finally, these graphic representations allow users to interact with genre instances using graphic user interface techniques (e.g., allowing participants of a debate genre instance to change sides by dragging and dropping the icon which represents them from the region representing the "For" point of view, to the region representing the "Against" point of view).

A method according to the present invention provides user-defined structured interaction online. The method comprising the steps of: defining an interaction genre; creating an operational instance of the genre, said instance being initialized to a predetermined state; monitoring input from online users operatively connected to said instance; updating a state of the instance and responding to user's requests if said input satisfies a criteria set by the instance's interaction rules; and broadcasting the updated state to all online users operatively connected to the instance.

According to a preferred embodiment of the present invention, a computer-based medium having stored programs readable by a computer is provided for causing the computer to execute method steps for facilitating interaction among a plurality of users operatively connected to the computer, the method comprising the steps of: receiving requests from the plurality of users to participate in an interactive session; registering said users by storing user identifications and passwords of respective users; storing said identifications and passwords in a user database; authorizing said users as participants in the interactive session upon receiving a clearance signal from the computer, setting parameters and rules governing the interactive session and informing the participants of the parameters and rules; monitoring inputs from the participants during the interactive session; and enforcing penalties upon participants violating said rules.

BRIEF DESCRIPTION OF THE DRAWINGS

These, and further objects, advantages, and features of the invention will be more apparent from the following detailed description of preferred embodiments and the appended drawings wherein.

DETAILED DESCRIPTION OF PREFERRED EMBODIMENTS OF THE INVENTION

A method and device according to the present invention support structured styles of interaction, or genres online. The interactions referred to are those that take place via networked services, including, but not limited to networked client/server services. As previously discussed, Internet Relay Chat (IRC) is one form of online interaction which enables users to post messages in one of several channels, each channel being a section related to a particular topic. Postings on the channel are seen by all other participates interacting with the same channel.

According to a preferred embodiment of the present invention, each channel of the IRC is treated as an instance of a genre. As such, interactions of the participants in the channel are governed by the interaction rules of the given genre, and violations of the rules dealt with using the genre's enforcement rules. For example, in a channel which is an instance of a debate genre, the order and length of the participant's postings are governed by the interaction rules of the debate genre, and interruptions are handled using the debate genre's enforcement rules.

The present invention provides dynamic genre state indicators including graphic or iconic representations which indicate both the genre active in the current channel (e.g., a lecture) and its state (e.g., who is the speaker; who are the spectators and whether the speaker is still in the middle of their formal presentation or whether the question and answer period has begun).

The present invention further provides support for online structured interaction, allowing users to set and update the interactions and enforcement rules. According to a preferred embodiment of the invention, a TCP/IP-based client/server service is provided in which users interact with each other via client applications running on client workstations, which in turn communicate with a server via a TCP/IP-based network. Network-based client/server services other than TCP/IP known in the art are also contemplated and can be used in the present invention. Examples with descriptions of such services—the clients and servers of which are written in Java—can be found in Gary Cornell and Cay Horstmann Core Java. second edition, SunSoft Press, A Prentice Hall Title, Mountain View, Calif. 1997, ISBN 0-13-596891-7. Descriptions of a server according to the present invention are provided with references to FIGS. 1 through 6, and of a client with reference to FIGS. 1, 7, 8, and 9.

Figure 1:
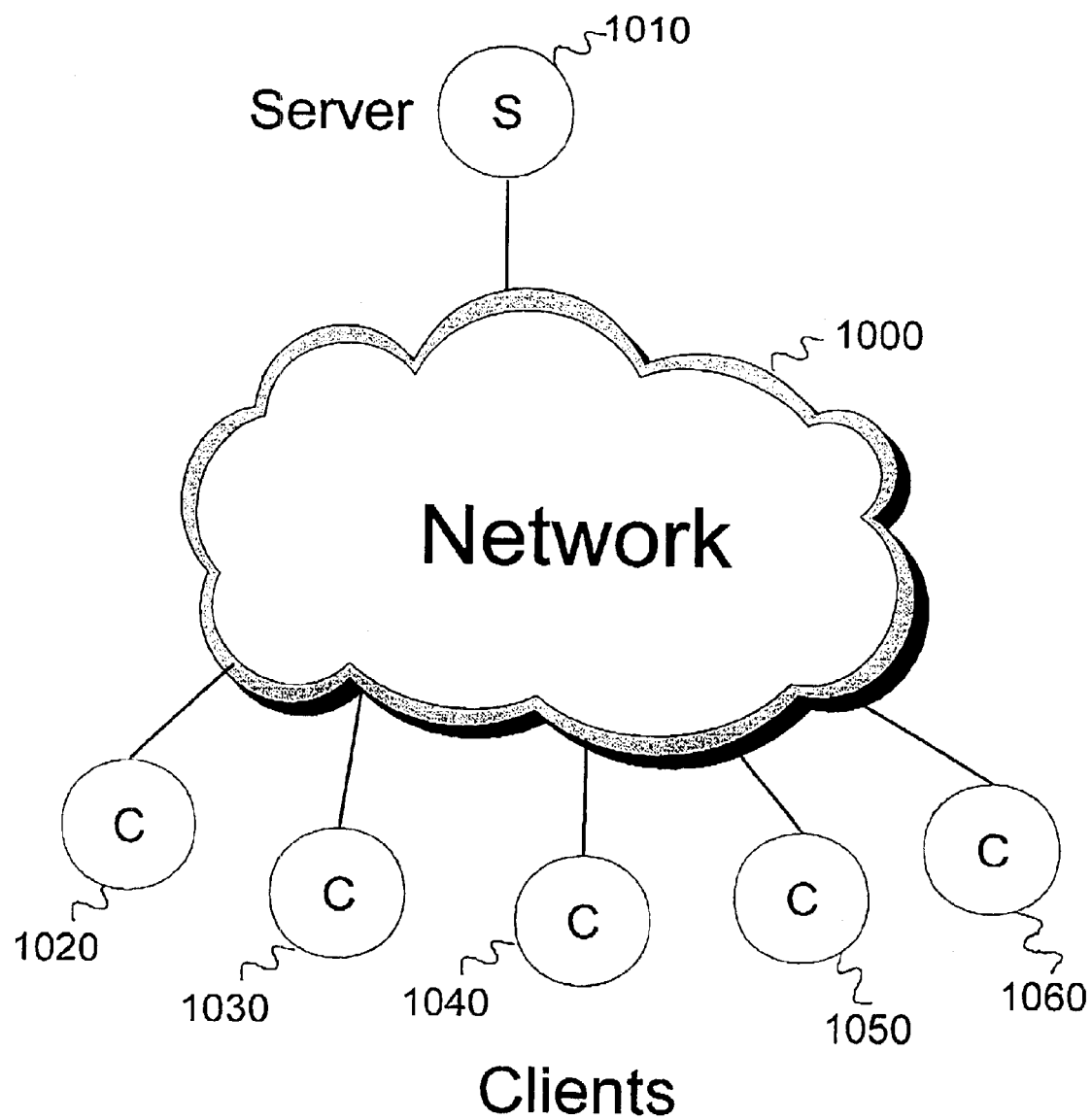
FIG. 1 shows a network topology employed according to a preferred embodiment of the present invention.

FIG. 1 depicts an overall logical network topology within which preferred embodiments of the current invention can be implemented. As shown, a server (1010) and clients (1020, 1030, 1040, 1050 and 1060) are all connected to the network (1000), through which the clients (1020–1060) and server (1010) communicate. Although only five clients (1020, 1030, 1040, 1050 and 1060) are shown in FIG. 1, the present invention is applicable to any number of clients.

The server (1010) includes, but is not limited to, any computing node which can run the Windows NT operating system sold by Microsoft or any equivalent operating system. The server 1010 also includes, but is not limited to, computers such as the ThinkPad or PowerPC sold by IBM.

Network (1000) is an electronic communication network. Examples of network (1000) include, but are not limited to, the Internet, the World Wide Web, an Internet and local area networks (LANs).

Each of clients (1202–1060) is a computer device or a computer workstation. Examples of clients (1020–1060) include, but are not limited to, an IBM ThinkPad running Windows 95, or Apple's Power MacIntosh running MacOS 8.5.6. Clients also include network-connectable mobile (i.e. portable) devices such as that sold under the trademark WorkPad by IBM, as well as smart cellular telephones (e.g., devices which can act as a cellular telephone as well as run network applications, like e-mail) sold under the trademark Nokia 9000i by Nokia.

Figure 2:
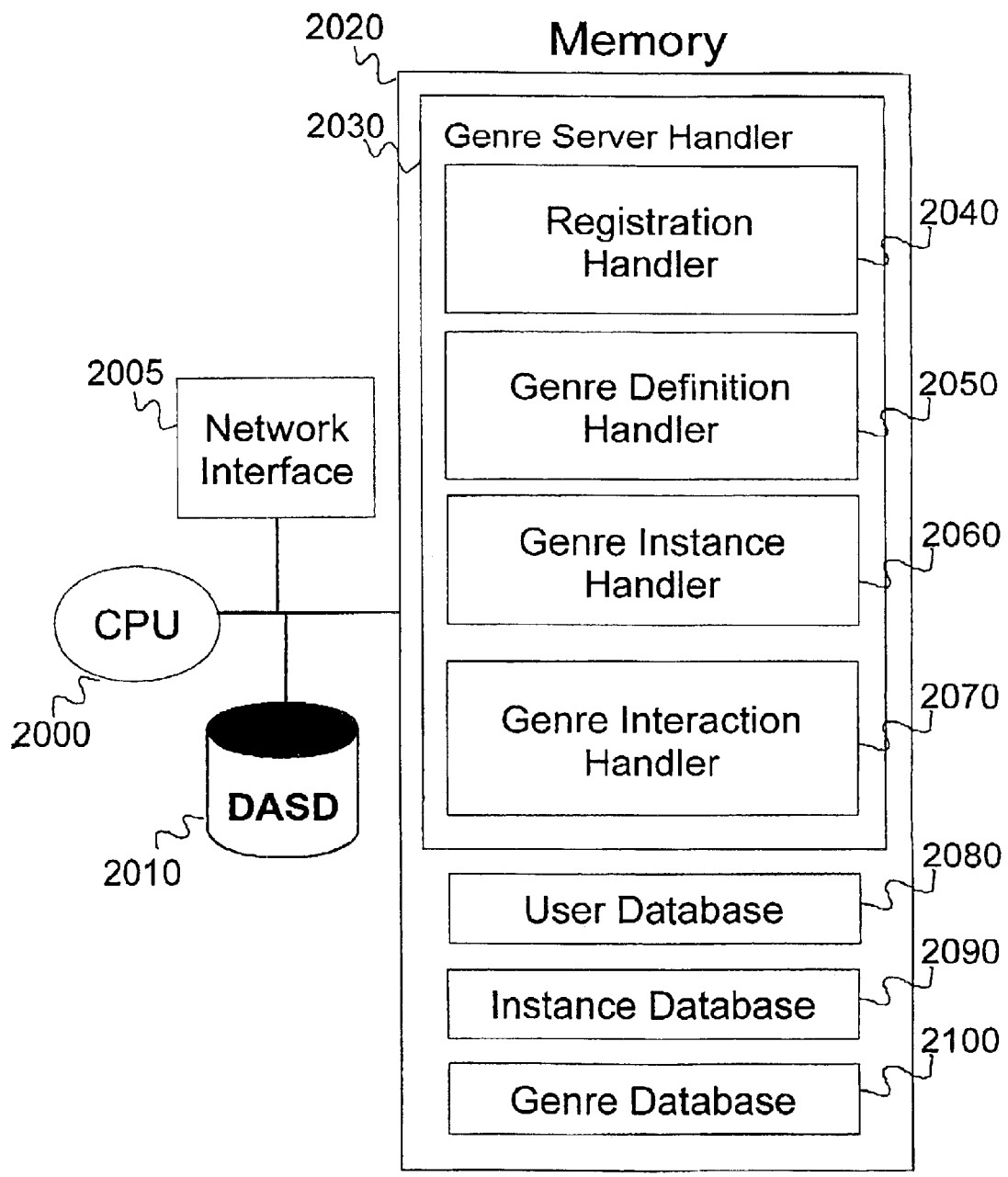
FIG. 2 is a block diagram of a server according to the present invention.

FIG. 2 shows a block diagram of major components of server (1010), which hosts the online conversation environment. The server (1010) preferably includes a CPU (2000), a network interface (2005), memory (2020) such as RAM, and a storage device (2010) such as a disk or DASD. According to an embodiment of the present invention, Genre Server logic is used to operate the server and is preferably embodied as computer executable code that is loaded remotely over the network via the network interface (2005), or locally from permanent optical CD-ROM, magnetic storage such as disk, or DASD (2010) into memory (2020) for execution by CPU (2000). Network communications to and from the server are made through the network interface (2005), communication types include but are not limited to Ethernet, token-ring, and wireless, such as via RF or IR. The memory (2020) preferably includes a genre server handler (2030) (discussed in more detail with reference to FIGS. 3 and 4) which contains a registration handler (2040) (discussed in more detail with reference to FIGS. 3 and 5), a genre definition handler (2050); a genre instance handler (2060) (discussed in further detail with reference to FIGS. 3 and 6); a genre interaction handler (2070); a user database (2080); an instance database (2090); and a genre database (2100). Database products usable as the user database (2080), the instance database (2090) and the genre database (2100) include but are not limited to the database server products sold by IBM under the trademark DB/2. Those ordinarily skilled in the art will appreciate that any of these databases (the user database (2080), the instance database (2090) and the genre database (2100)) could be run on another remote network connected node and then accessed via the network (1000).

The genre definition handler (2050) is an interface which provides access to genre definitions managed by the genre database (2100). The genre definition handler (2050) allows connected clients to alter the genre including: Add (e.g., create an entirely new genre); Delete (e.g., remove existing genre); and Modify (e.g., retrieve an existing genre, add one or more new rule to it, and then save the genre back into the genre database (2100)).

In a preferred implementation, a genre definition includes a list of required roles, roles being bindings between user ID's and participant names that are present in the genre (e.g., the "speaker" in a lecture genre); a default role, i.e., the role that is automatically assigned to users who have not been assigned a role (e.g., the spectators in a lecture genre); other roles (e.g., the members of the "For" and "Against" teams is an instance of a debate genre, these roles being chosen by the participants themselves during a debate); an initial state being conditions present prior to start of genre instance; interaction rules as applied to each genre instance; and enforcement rules which are applicable when a participant violates the interaction rules.

These definitions can be stored as simple text files, each section delimited by the name of the section with the entries for each preceded by a tab character. Those skilled in the art will appreciate that other data structures and representations could be used as well. Those skilled in the art will also appreciate that genre definitions can include additional headings such as access control restrictions, or types of questions a speaker is allowed to answer.

As an example, the definition for a lecture genre is listed:
Title
  Basic Lecture
Roles
  Required: Speaker
  Default: Spectator
  Other:
Initial State
  Presentation_period
Interaction Rules
  IF (Presentation_period OR Q&A_period) THEN (can_post Speaker)
  IF (posting="Any questions?") THEN (Q&A_period) AND (NOT Presentation_period)
  IF (Q&A_period) THEN (can_post Spectator)
Enforcement Rules
  IF (poster=Spectator) AND (NOT Q&A_period)) THEN (Interruption)
  IF (Interruption) THEN (increment interrupt_count)
  IF (Interruption) THEN (send_message "Don't Interrupt! Wait for Q&A period")
  IF (interrupt_count>10) THEN (disconnect)

This genre, entitled "Basic Lecture," specifies that there is one required role: Speaker, and one default role: Spectator. Impliedly, any user other than the speaker that joins a given instance of this genre is assigned the role of Spectator. Initially, instances of this genre begin with Presentation_period (a flag) being true. The enforcement and interaction rules are each checked, respectively, each time there is a posting to a genre instance. For this instance, the interaction rules for Basic Lecture stipulate that Speaker can post both when Presentation_period and Q&A_period are true, but that any Spectator can only post when Q&A_period is true. They also specify that Q&A_period becomes true and Presentation_period false when "Any questions?" is posted. Also for this instance, the enforcement rules stipulate that an interruption has occurred if a Spectator posts when Presentation_period is true. The enforcement rules also specify that whenever Interruption is true, that the poster's interrupt_count is to be incremented. Those with ordinary skill in the art will appreciate that this could be accomplished by modifying a interrupt_count field in the user's entry in the user database (2080). Also, when Interruption is true, the user who made the offending post is sent the message: "Don't interrupt! Wait for Q&A period," and, if the offending user's interrupt_count is above 10, they are disconnected. Those with ordinary skill in the art will appreciate that methods for sending a given user a warning message include but are not limited to posting the message within the current application (e.g., if Lou is the interrupter, by posting "Lou: Don't interrupt! Wait for Q&A period."), or by sending the message via e-mail. Those with ordinary skill in the art will also appreciate that a given user's interrupt_count could be checked by retrieving it from the user's entry in the user database (2080).

According to a preferred embodiment of the present invention, the initial state includes a description of the graphic representation of the genre with the interaction and enforcement rules specifying how changes in the state of a given instance are represented. For example the initial state of a genre could indicate that a geometric shape will be used for the representation with colored dots—one per active user—positioned to represent interactivity. Examples with further descriptions are given with reference to FIGS. 10 through 13.

According to the present invention, an interaction rule specifies how the graphic representation of the genre instance should change in response to specified conditions. For example, it is specified that the dot representing a user who has just posted should change position to indicate the user's action. Similarly, an enforcement rule specifies how the graphic representation should change to indicate the triggering of an enforcement rule (e.g., the dot representing a given user becomes larger, or surrounded by a jagged line to indicate that the user has just interrupted someone).

According to a preferred embodiment of the invention, the effect of triggering an enforcement rule includes preventing the offending user from future participation. This is implemented by modifying a given user's user database (2080) entry to indicate that the user is not allowed to connect. Such an entry modification is also used to block the user from participating for a particular period of time (e.g., a week). A given user can also be blocked from making any sort posting through a similar sort of user database (2080) entry modification. The blocking is implemented by executing a given genre interactions rule and checking that no user who had their Not_allowed_to_post field set in the user database (2080) entry is permitted to post, this field (i.e., Not_allowed_to_post) having been set as the result of a past triggering of an enforcement rule.

A genre interaction handler (2070) according to the present invention updates that state of a given operational genre instance in response to user input using the instance genre interaction and enforcement rules. Note that both genre instance handler (2060) and genre interaction handler (2070) access and store state information in the genre instance database (2090). The genre interaction handler (2070) takes each user input it receives and compares it to the antecedents of all of the current genre instance's interaction and enforcement rules (e.g., (poster=Spectator) AND (NOT Q&A_period)), executing the consequences (e.g., modifying the graphic representation of the user in response to a legal action they have made, or disconnecting a user in response to triggering of an enforcement rule). Those ordinarily skilled in the art will appreciate that the genre instance handler (2070) can also receive input regarding the passage of time (e.g., input sent as the result of a timeout). Thus, both interaction and enforcement rules can contain antecedents which include time (e.g., "more than 4 minutes"). Those with ordinary skill in the art will further appreciate that in addition to making updates to the instance database (2090) to indicate changes in the state of a given genre instance, the genre interaction handler can also perform other sorts of actions, including but not limited to: disconnecting a given user; sending a message to one or more users (e.g., using e-mail); updating a given user's user database (2080) entry (e.g., to indicate that they have made yet another interruption); barring a user from future connections for a specified period of time; and barring a user from making postings for specified period of time.

Figure 3:
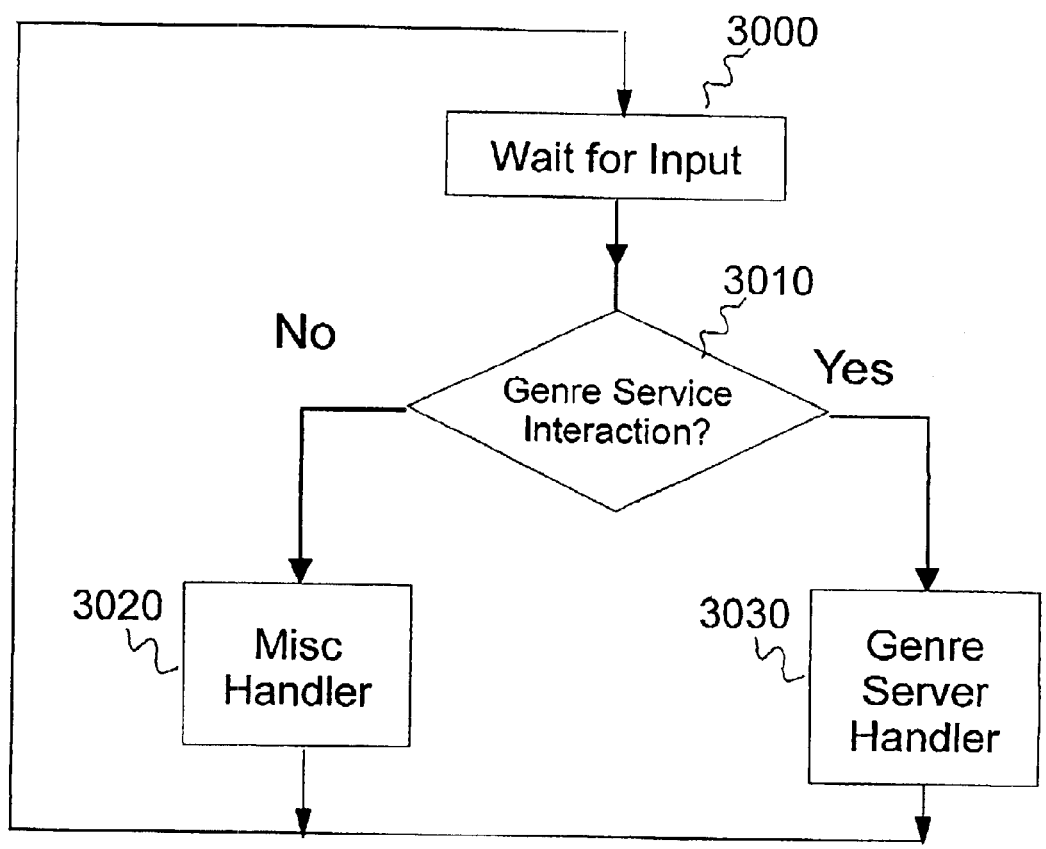
FIG. 3 is a flow diagram of an exemplary process of the server logic according to the present invention.

FIG. 3 depicts an example of the genre server's logic, which is a module having stored codes executable by CPU 2000 to operate the server. As shown, the server waits for input in 3000. The input is checked in step 3010 for genre service interaction, and if the genre system is involved, then, in step 3030, the genre server handler (2030) is invoked; otherwise a miscellaneous handler is invoked in step 3020. Those with ordinary skill in the art will appreciate that the checking process in step 3010, can be effected by identifying which TCP/IP port the server was contacted on. See, Douglas Comer, Internetworking with TCP/IP, Vol. 1 Principles, Protocols and Architecture. Prentice Hall, Englewood Cliffs, N.J., 1991. Following the completion of either handler, i.e., steps 3020 or 3030, the flow continues at step 3000, where the server (1010) waits for input.

Figure 4:
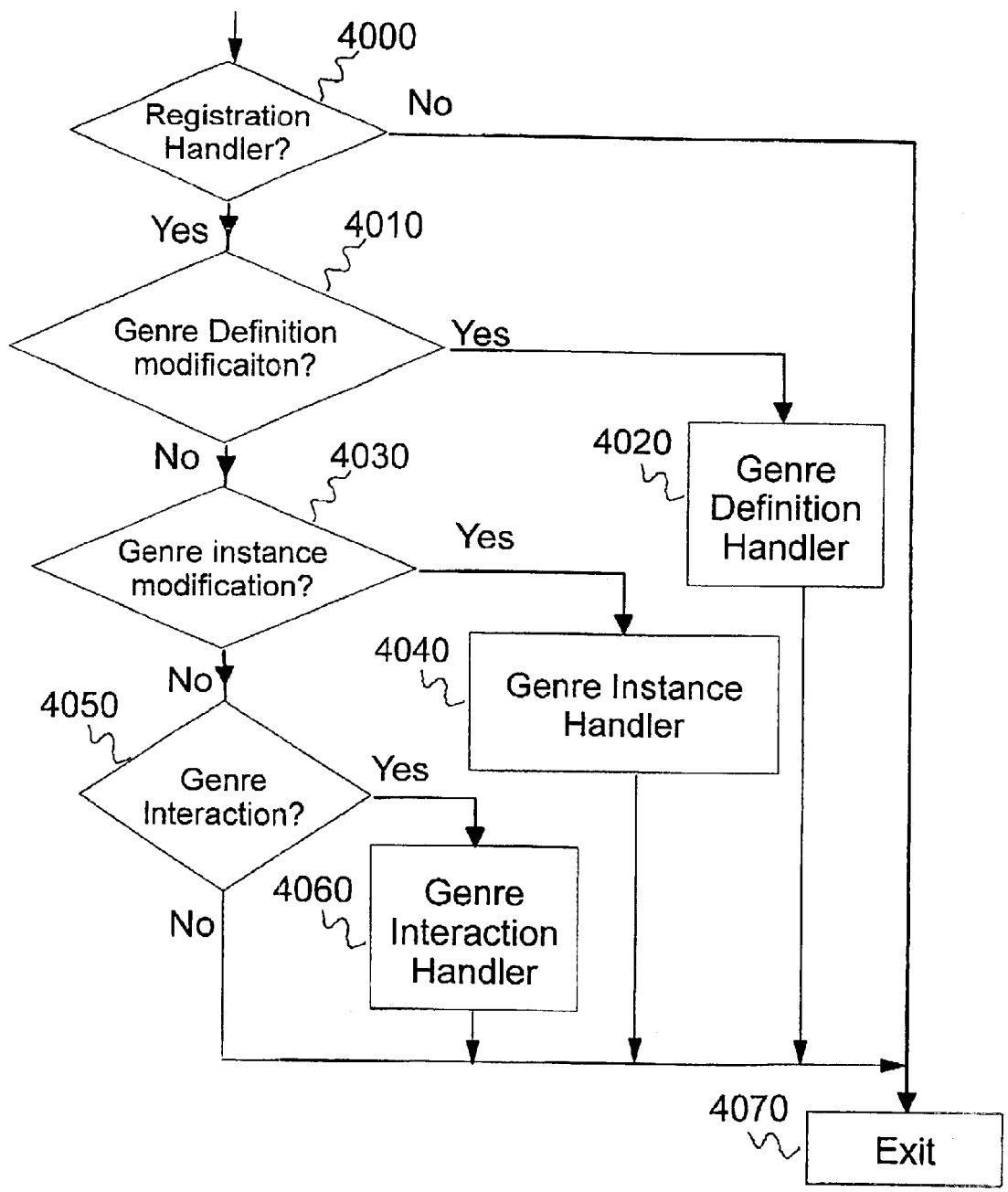
FIG. 4 is a flow diagram of a process of a genre server handler according to the present invention.

FIG. 4 illustrates a representative flow of the genre server handler (2030) in handling client applications and to enable respective users to interact via the genre system. As shown, in step 4000 the registration handler (2040) is called to authorize the user making the request. If it returns "no," the genre handler (2030) exits in step 4070. Otherwise, the request is checked to see whether the user wants to define a new genre in step 4010. The registration handler will be further described with reference to FIG. 5. If the user is to define a new genre, the genre definition handler (2050) is invoked in step 4020 to handle definitions input by the user. After which the genre handler exits in step 4070. If the request is not to define a new genre, then in step 4030 the request is checked to see whether the user wants to create or modify an instance of a genre. If so, the genre instance handler (2060) (further described with reference to FIG. 6) is invoked in step 4040 to handle modifications input by the user. After execution of the modification, the genre server handler (2030) exits in step 4070. Otherwise, in step 4050, the request is checked to see whether it involves an interaction in one of the operational genre instances. If not, the genre server handler (2030) exits in step 4070. If so, the genre interaction handler (2070) is invoked in step 4060 to facilitate interaction by the user in the operational genre instances. After whose operation, the genre server handler (2030) exits in step 4070.

Figure 5:
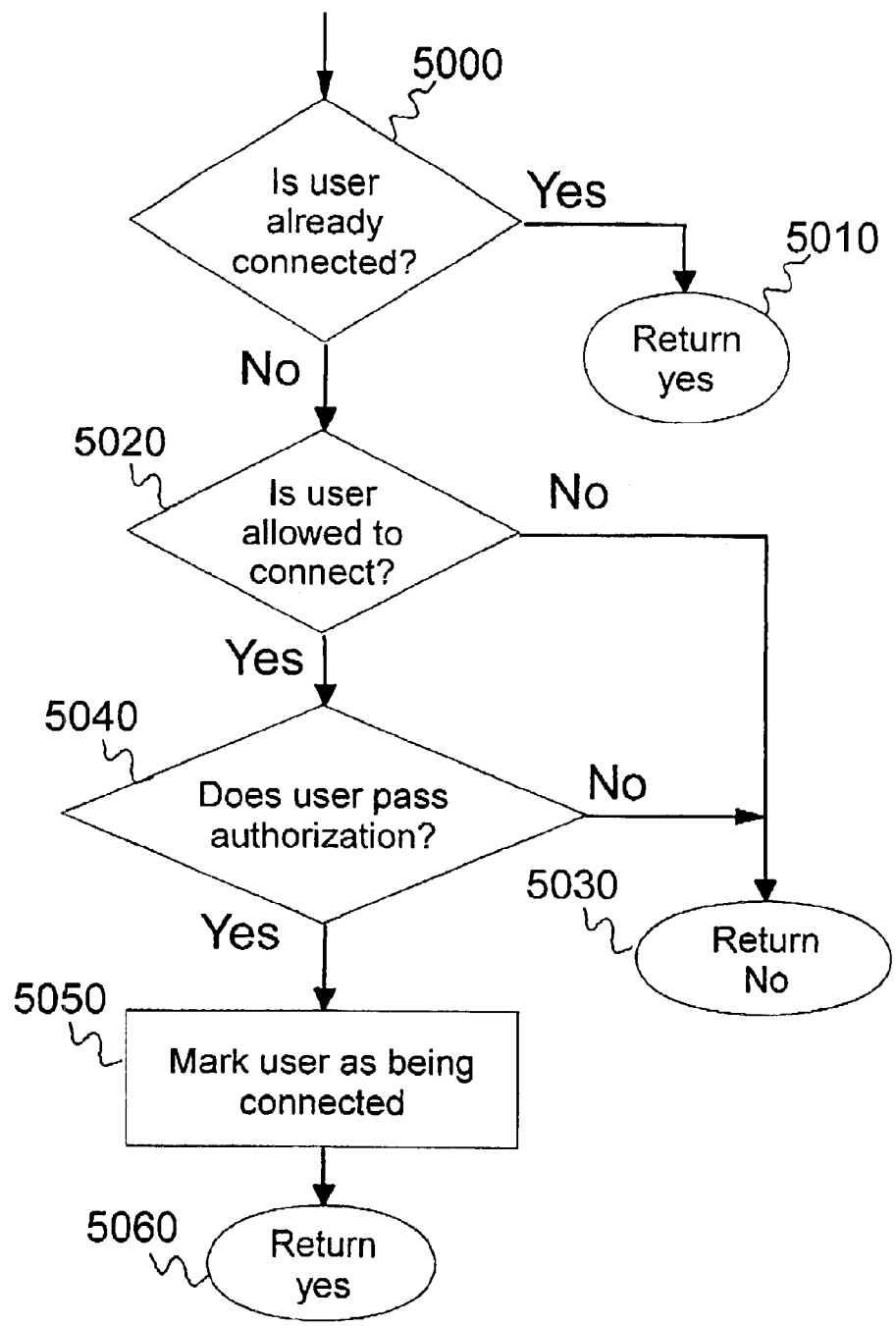
FIG. 5 is a flow diagram of a process of a registration handler according to the present invention.

The registration handler (2040) determines whether to allow a given user access to the genre server handler (2030). Referring to FIG. 5 in step 5000, the handler first checks whether the given user is already connected to the server by consulting the user's entry in the user database (2080) to see whether they are marked as being currently connected; if so, the handler returns yes in step in 5010. If the user is not already connected, then, in step 5020, the registration handler (2040) checks to see whether the given is permitted to connect. This determination can also be made by consulting the user database (2080), wherein prohibitions to enter can be found in flags associated with the user in the user database. Grounds for denial can include, but are not limited to, a missing entry in the database, such as user has not signed up or paid their membership fee; user's entry indicates that he is not allowed to connect for some specified period of time (e.g., as a penalty for violating genre rules during a prior usage of the system). If the given user is not allowed to connect, then the registration handler (2040) returns no in step 5030. If the user is allowed to connect, then they must pass an authorization challenge in step 5040. According to a preferred embodiment of the present invention, this challenge prompts the user to specify the user ID and password and the ID and password is compared against stored information in the user's user database (2080) entry. If the user does not pass this authorization, then the registration handler returns no in step 5030. Otherwise, the user is marked as being connected in the user database (2080) in step 5050, and yes is returned in step 5060.

Preferably, a session key is assigned to the user's connection and used to indicate that the user is being connected. This would enable a given user to participate in multiple genre instances on the same server (1010) simultaneously.

Figure 6:
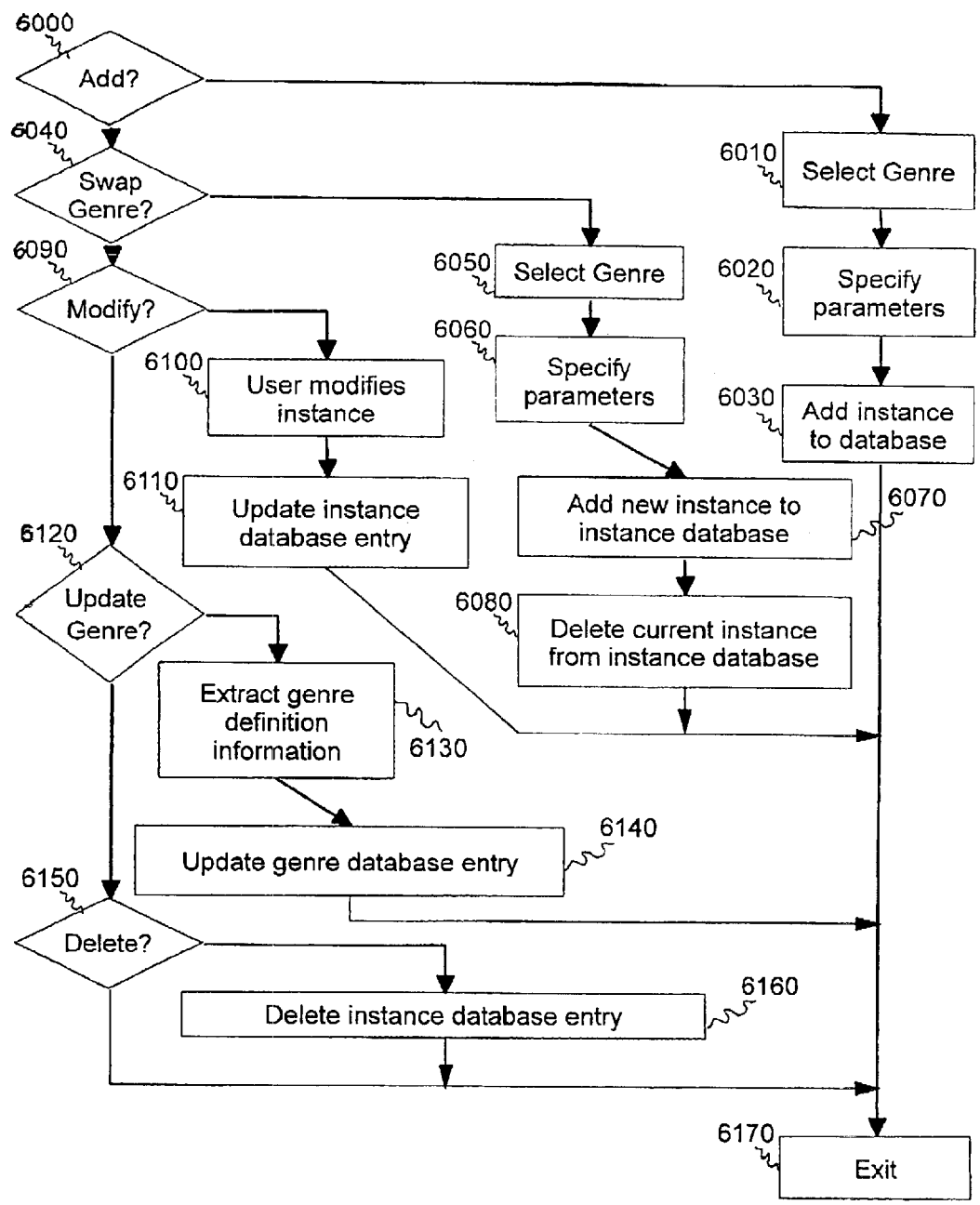
FIG. 6 is a flow diagram of a process of an instance handler according to the present invention.

FIG. 6 depicts an exemplary process of the genre instance handler (2060), which is an interface providing access to genre instances for network-connected clients. The genre instance handler (2060) preferably allows connected clients to add (e.g., create new instances of a given genre); delete (e.g., remove existing genre instance); modify (e.g., add one or more new rules to those of the current genre instance); update the base genre definition (e.g., if two new enforcement rules were added, updating the definition of "Basic Lecture" to include the two rules.); and swap the base genre of a given instance (e.g., switching the instance genre from "Basic Lecture" to "Debate.").

As shown, in FIG. 6, the request is checked to see whether the user wants to create a new instance of a genre. If so, in step 6010 the user selects one of the existing genres from the genre database (2100). Note that the user can at his option create a new genre each he connects using the genre definition handler (2050). Once selected and retrieved from the genre database (2100), the user can specify bindings between user ID and genres, in step 6020, particularly all required parameters for the selected genre. For the example of the "Basic Lecture" genre given above, the only required parameter would be a user ID to associate with the speaker. Then, in step 6030, the new instance of the genre is added to the instance database (2090). In a preferred implementation, entries in the instance database (2090) include the following information: the instance's genre title (e.g., "Basic Lecture"); a list of the required roles and their bindings (e.g., Rex is the speaker); the default role (if any) and the bindings to this role (e.g. Heidi, Rayna, and Julio are spectators); a list other roles and bindings to these roles; the initial state; a list of interaction rules; a list of enforcement rules; and the current state (e.g. the "Basic Lecture" genre's "presentation period").

After storing the new instance in the instance database (2090), the genre instance handler (2060) exits in step 6170.

If the request is not one to add to a new instance, step 6040 checks whether it is a request to switch the genre of the current instance. If so, in step 6050 the user selects a new genre from the genre database (2100). Note that if the genre the user wants is not already in the genre database (2100), then the user can define it using the facility provided by the genre definition handler (2050) as discussed above. Once retrieved from the genre definition database (2100), in step 6060 the user specifies all required parameters, which include bindings between the participants of the current instance and the roles of the new genre, especially any required roles. Preferably, the new instance includes the session ID of the current instance assigned to it. In step 6070, the new genre instance is added to the instance database (2090); and in step 6080 the current instance is deleted. Then, in step 6170, the genre instance handler (2060) exits.

If the request was not to switch the genre of the current instance, then step 6090 checks whether the user wants to modify the current instance in some other way. If so, then in step 6100 the user makes whatever changes he wishes. These changes could include modifications to any of the data describing the current instance (e.g., adding a new interaction rule or modifying enforcement rules or penalties). Preferably, the information concerning a given genre instance is expressed by a text file. Any changes a user wishes to make to a given genre instance can be made simply by modifying the text file describing the instance. In step 6110, the given genre instance's database entry is updated in the instance database (2090) (e.g., overwriting the current instance description file with the newly modified one). Then, in step 6170, the genre instance handler (2060) exits.

If the request is not to modify the genre instance, the request is checked to see in step 6120 whether it is to update the genre definition of the current instance's genre. If so, in step 6130, all data relevant to the genre definition is extracted from the current state information of the genre instance. A preferred implementation includes: a list of the required roles, the default role (if any), a list of other roles, a description of the initial state, a list of interaction rules, and a list of enforcement rules. In step 6140, the genre's definition is updated in the genre database (2100); and in step 6170 the genre instance handler (2050) exits.

If the request is not to update, the request is checked in step 6150 to see whether to delete the current instance; if not, the genre instance handler exits in step 6170. If it is a deletion request, then in step 6160, the entry for the current instance in the instance database (2090) is deleted followed by the genre instance handler (2150) exiting in step 6170.

Figure 7:
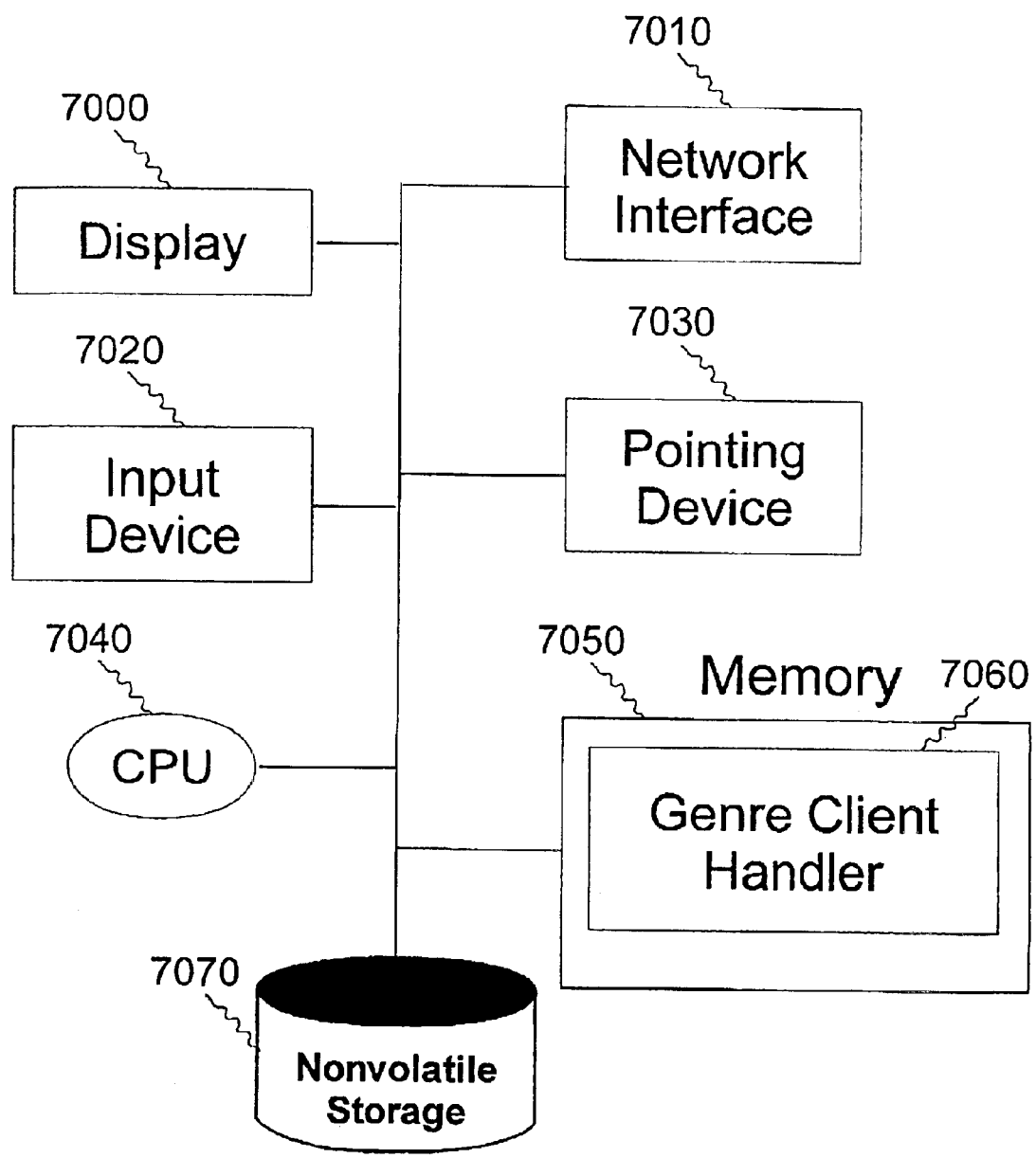
FIG. 7 is a block diagram of major components of a client according to the present invention.

FIG. 7 shows a block diagram of major components of a client (1020–1060) according to the present invention. As shown, the client preferably includes a display (7000) (e.g., a color PC display monitor); a network interface (7010), which may be one of Ethernet, Token-Ring, or wireless, such are RF- or IR-based; an input device (7020), which may be one of a keyboard, a touch-sensitive pad, or the like; a pointing device (7030), which may be a mouse or stylus, which are both passive, like that used with the IBM Work-Pad. The input device 7020 may be active, like used with Cross CrossPad; a CPU (7040); memory (7050), and non-volatile storage (7070) such as a hard disk, or writeable nonvolatile memory. In a preferred embodiment, a software module genre client logic is preferably embodied as computer executable code that is loaded remotely over the network via the network interface (7010), or locally from magnetic storage such as disk (7070) into memory (7050) for execution by CPU (7040) to operate and control the functions of the client. The memory (7050) preferably includes a genre client handler (7060) for handling interfacing functions of the client.

One ordinarily skilled in the art will appreciate that there are many way to provide a graphic user interface (GUI) given the specified client platform (1020–1060). Such GUIs can be provided for workstations running either Microsoft Windows 95 using the Java programming language. See Gary Cornell and Cay Horstmann Core Java. second edition, SunSoft Press, A Prentice Hall Title, Mountain View, Calif. 1997, ISBN 0-13-596891-7. On personal data assistants (PDA), like that sold under the trademark WorkPad by IBM, GUIs can be developed in the C programming language, using the graphic libraries supplied by Palm Computing.

The content of the client's user display is preferably created by the software running on the client (1020–1060), based on non-graphic data sent by the server (1010). The client (1020–1060) may add another colored dot to the graphical representation of the current genre instance in response to a message from the server (1010) such as "new spectator 'Roxanne' joins.". Alternatively, the server may send to the client the full graphic representation, in BMP or equivalent format, which the client (1020–1060) simply projects onto its display (7000). Other versions of presentation to the display known to one ordinarily skilled in the art and within contemplation of the present invention.

Figure 8:
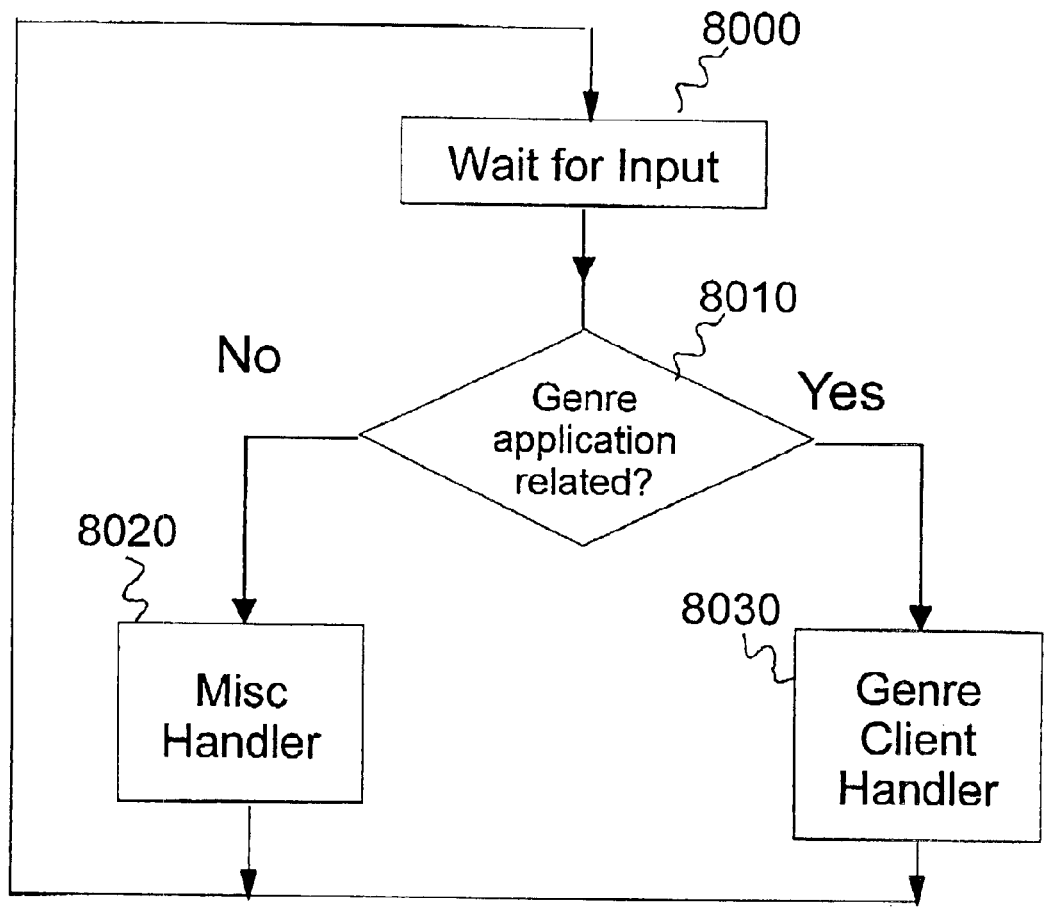
FIG. 8 is a flow diagram of a process of a client logic according to the present invention.

FIG. 8 depicts an exemplary flow process of the genre client's logic. As shown, in step 8000, the client waits for input—both remote input from the network via the network interface (7010), and local input from the user via the input (7020) or pointing (7030) devices. In step 8010, the client determines whether the input is related to the genre application; if so, the client sends the input to the genre client handler (7060) in step 8030; if not, the client sends other inputs to other miscellaneous handlers in step 8020. Following the completion of steps 8020 or 8030, the logic continues waiting for input at step 8000.

Figure 9:
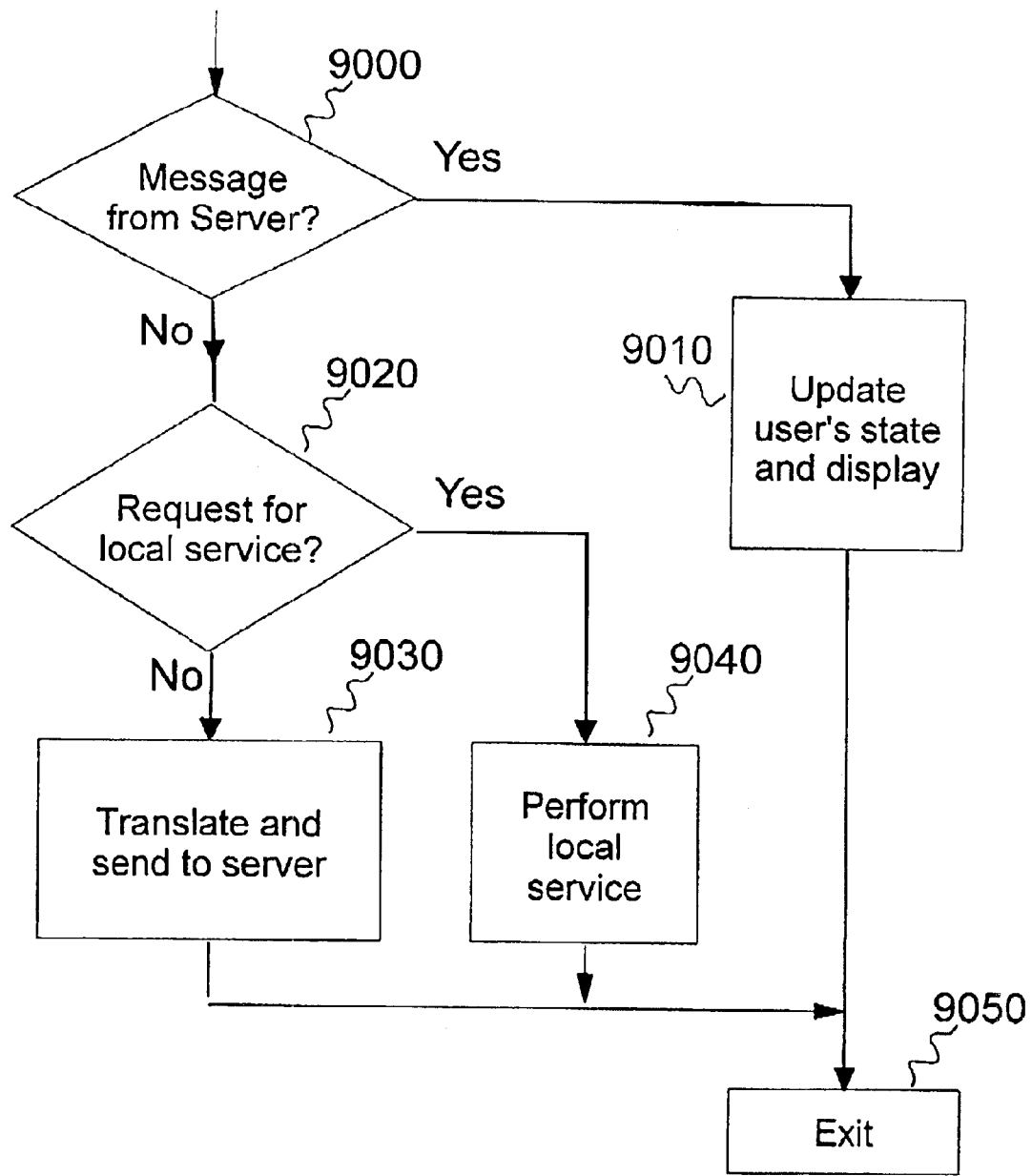
FIG. 9 is a flow diagram of a process of a genre client handler according to the present invention.

FIG. 9 shows an exemplary flow of process executed by the genre client handler (7060). The software module genre client logic running the client (1020–1060) communicates with the server (1010) via the network (1000) to enable the end-user to communicate with other operationally connected users. As shown, input at the genre client handler is checked to see whether it is information from the server (1010) in step 9000; if it is, the state or display of the client application are updated using this information. Examples include the posting of messages from other users and the update of the graphic representation of the user's current genre instance. Once updated, the genre client handler (7060) exits in step 9050. If the input is not from server 1010, the input is checked whether it is a request for local service from the end user in step 9020. Such requests may include, but are not restricted to, requests from the end user for the user ID associated with a given iconic representation. For example, a client may ask "Who is associated with the red dot?", requested by the user double-clicking his mouse when the cursor is pointing to the red dot. If the request is local, then in step 9040, the request is fulfilled, following which the handler (7060) exits in step 9050. Otherwise, the request is treated as one which must be sent to the server. This involves translating the request, if necessary, and sending the data to the server. Exemplary requests include the user sending a posting to the current genre instance. For example, a question (in text), by typing the text while the cursor of the user's GUI is position in a text entry area; the user sending a request, for example, user signaling that she wants to ask a question when possible, by double clicking a button marked "Question" in their GUI; the user dragging and dropping the icon which represents him to a particular area in the graphic representation of the current genre instance, by moving one's icon from the pro to the against area in the graphic representation of a debate; the user requesting a modification of the current genre instance, including modifying its parameters, such as specifying a new rule for the current genre instance, or deleting it, by double clicking a button marked "Modify current genre instance," and then making the relevant mouse clicks or keystrokes; the user requesting a modification to the definition of the current genre instance's genre, such as by overwriting the definition of the Basic Lecture genre to include the new rules that have been added to the current instance of the Basic Lecture genre. This may be implemented by double clicking a button marked "Modify current genre definition" and then making the relevant mouse clicks or keystrokes; the user requesting to leave the current genre instance, by double clicking a button marked "Leave current genre instance"; the user requesting to join an existing genre instance or create a new genre instance, by double clicking a button marked "Join instance" or "Create instance", respectively, and then making the relevant mouse clicks or keystrokes; the user requesting to modify, delete or add a new genre definition, such as by double clicking a button marked "Modify genre definition", "Delete genre definition", or "Add genre definition", respectively, and then making the relevant mouse clicks or keystrokes.

Figure 10:
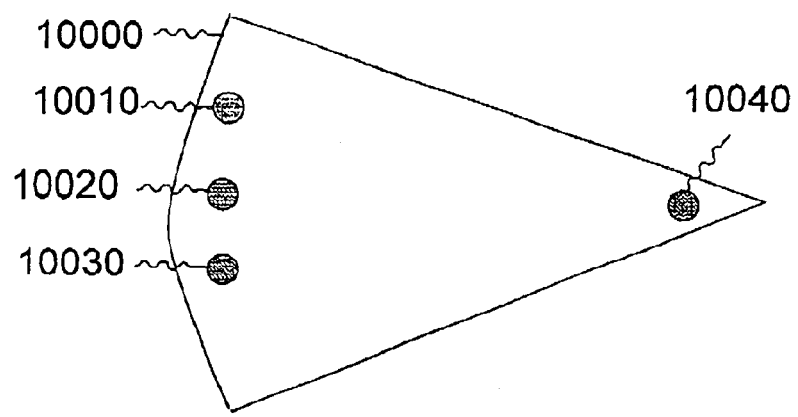
FIG. 10 shows an exemplary graphic representation of a lecture.
Figure 11:
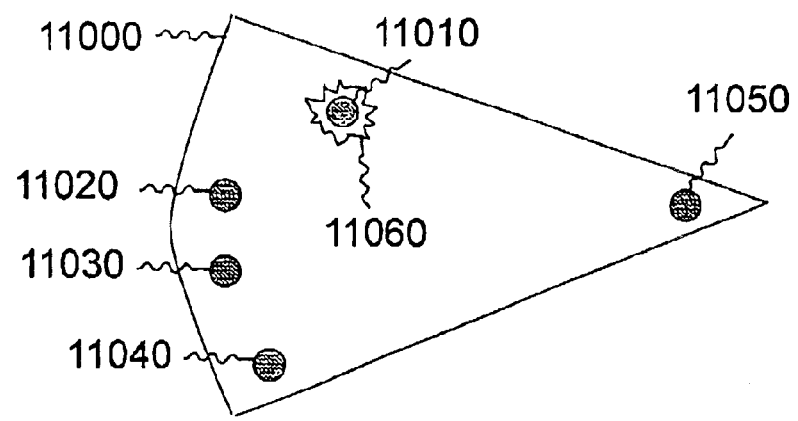
FIG. 11 shows another exemplary graphic representation of a lecture.

The following descriptions are directed to examples of genres, including descriptions of specialized graphic representations for each genre. FIGS. 10 and 11 depict an example of the graphic representation of a lecture genre. As shown in FIG. 10, the lecture is represented by the pie slice 10000, the speaker by the colored dot 10040, and the spectators by the colored dots 10010, 10020, and 10030. The initial state—how instances of this genre begin—include the steps of: (1) the lecture is represented by the pie slice; (2) the speaker is located at the tip of slice, and (3) all of the spectators are located back at the curved edge. The default role for this genre is that of spectator, meaning that anyone who joins an instance of this genre is made a spectator and positioned back on the curved edge of the slice. In general, in this graphic representation of a lecture, the more a user speaks, the further towards the tip of the slice the user move, such as seen in FIG. 11. Here the pie slice 11000 contains 5 dots 11010–11050. One of these dots, 11040, represents a user who has just joined the genre instance and, so is positioned on the curved edge. One of the other dots, 11010, represents a spectator that has asked a question, and, so, his dot has moved towards the point to represent this posting.

Those with ordinary skill in the art will appreciate that graphically, dot 11040 as a new user can be indicated simply by a different color from the other dots, and each dot representing a different user can also be indicated by each dot having a different shape or letter.

This graphical representation also provides a way to represent a given user speaking out of turn. As shown, a jagged line 11060 encircles dot 11010 to indicate that dot 11010's user spoke out of turn. Those skilled in the art will appreciate that the size or brightness of the icon representing a given user can be increased each time he interrupts, allowing other participants to see how many times the given user has interrupted in the current instance. Those skilled in the art will also appreciate that other qualities of a given user—e.g., how many times they have interrupted in the past could also be depicted, the information retrieved from the user database (2080) while in the process of generating an icon for the user.

Figure 12:
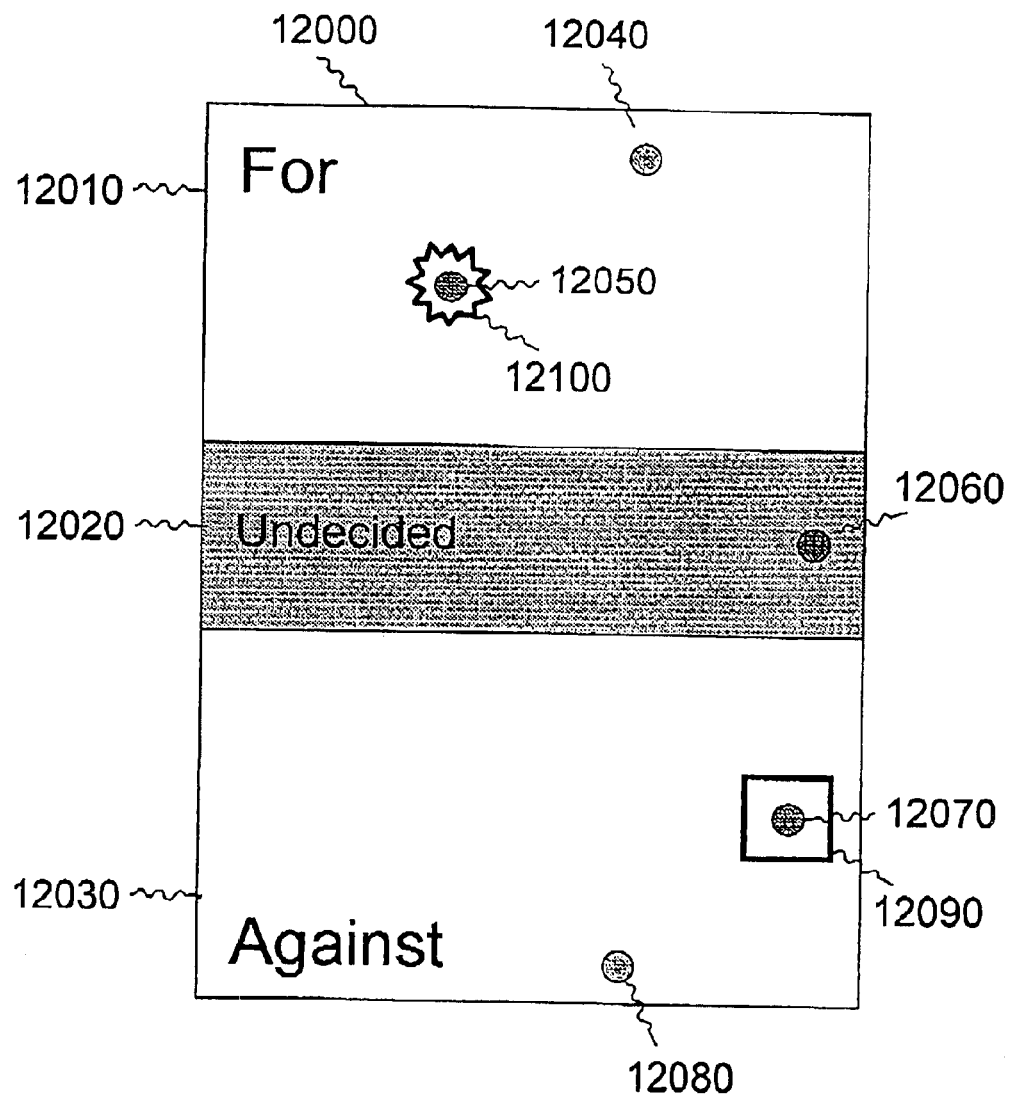
FIG. 12 shows a graphic representation of a debate.

FIG. 12 shows an example of a graphic representation of a debate genre. As shown, each instance is represented by a rectangle (12000) which is divided into three regions: For (12010), Undecided (12020), and Against (12030), each corresponding to the 3 possible states of mind of the participants; Undecided being the default. All new corners to instance of this type of genre are positioned in the undecided area (12020). FIG. 12 shows five current users, depicted by dots 12040, 12050, 12060, 12070, and 12080. As shown, the users represented by dots 12040 and 12050 are arguing for the current debate topic; with the users represented by dots 12070 and 12080 arguing against; dot 12060's user not having made up her mind yet. Note that if a new user joined this genre instance, his dot would be positioned in the Undecided area. To change argument teams, all a user needs to do is to drag and drop her icon into the desired team's region. E.g., to join the For team, dot 12060's user need only drag and drop his dot into the For region (12010). This request—translated from the graphic commands—would be sent from the user's client to the server (1010), which in turn, would update the state of the genre instance and then broadcast this new state to all operationally connected users.

FIG. 12 also depicts a square (12090) around dot 12070. This is a graphic means of indicating that it is now dot 12070 user's turn to speak. The jagged edge (12100) around dot 12050 indicates that dot 12050's user (i.e., the user represented by dot 12050) has spoken out of turn.

This graphic representation also has a means of indicating how much a given user has spoken, preferably by positioning the dot closer to the Undecided region (12020) the more the given user has spoken. Thus, as shown, the users represented by dot 12040 and 12080 have spoken little, if at all; while the users represented by dots 12050 and 12070 have spoken a fair amount, and nearly the same as each other.

Those with ordinary skill in the art will appreciate that the definition of this type of genre can include rules indicating that turns will be allocated so that the turn to speak alternates back and forth between the For and the Against teams. An enforcement rule could specify a maximum post length after which a given post is truncated. Overly long postings could also result in some graphic display, such as a modification to the speaker's dot, e.g. an "X" printed across it.

Figure 13:
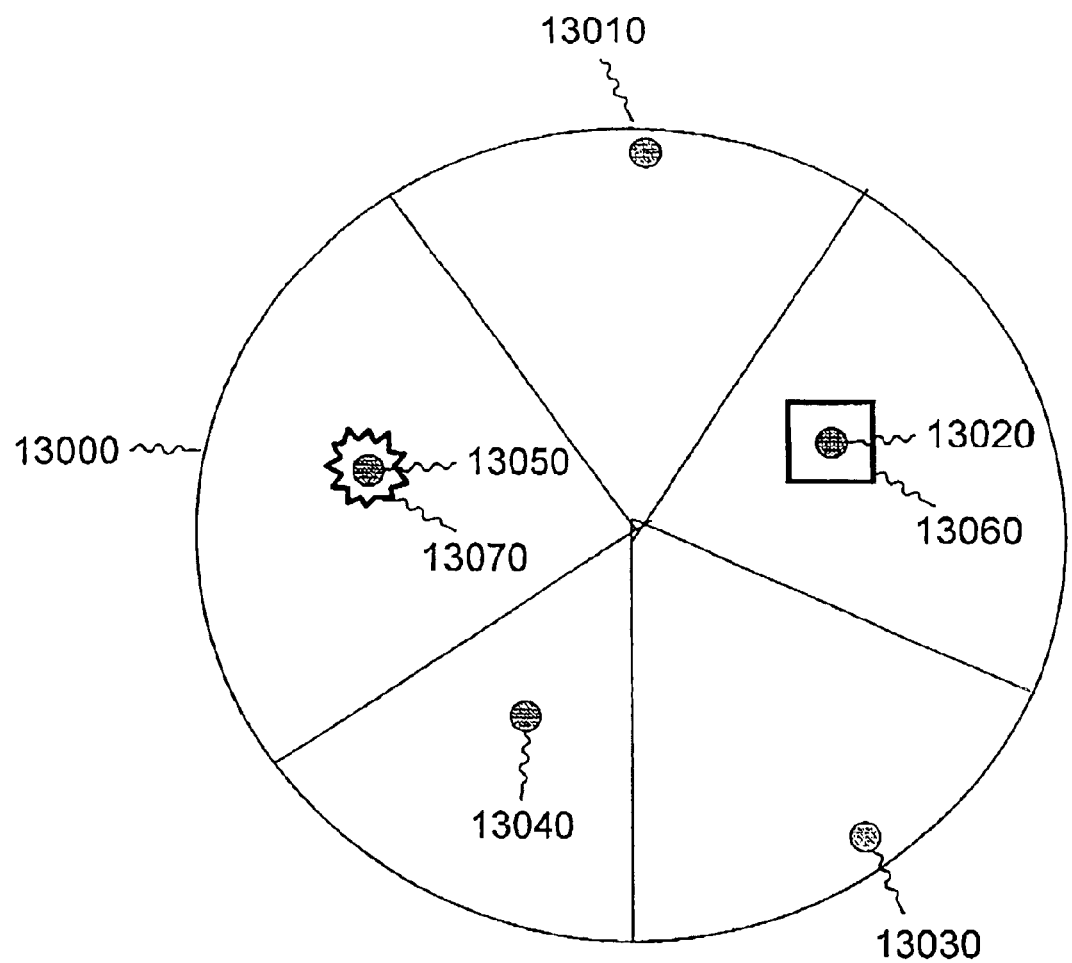
FIG. 13 shows a graphic representation of a roundtable discussion.

FIG. 13 depicts an example of a graphic representation of a roundtable discussion, such as a discussion in which each and every participant is supposed to speak, usually one after the other in rotation. As shown, the graphic representation includes a circle divided into sections (13000), one for each user, who is represented by a dot (13010 through 13050). The box (13060) around dot 13020, indicates that is dot 13020 user's turn to speak. The jagged line (13070) around dot 13050 indicates that the user represented by dot 13050 has spoken out of turn. This graphic representation also has a means of indicating how much a given user has spoken, preferably by positioning user dots closer to the center the more the given user has spoken. Thus, as shown, the users represented by dot 13010 and 13030 have spoken little, if at all; while the users represented by dots 13020, 13040 and 13050 have spoken a fair amount, and nearly the same as each other.

Those with ordinary skill in the art will appreciate how similar graphic representations can be used to exploit the present invention to support genres which include, but are not limited to: a personal office which an area owned by one user in which visitors come and talk—mostly to the office owner; a court room interaction genre, having a judge, defendant, plaintiff, defending and prosecuting attorneys, witnesses, jury, and spectators; and a help line with help requesters and providers with preferred embodiments of the present invention having been described. Alternatives, various modifications and improvements will occur to those skilled in the art. Thus, the detailed description should be understood as an example and not as a limitation. The proper scope of the invention is properly defined by the appended claims.

What is claimed is:

1. A method of user-defined structured interaction online, comprising the steps of: defining a social interaction genre for live computer-mediated communication between at least two users; creating an operational instance of the genre, said instance being initialized to a predetermined state; monitoring input from the at least two users operatively connected to said instance; specifying a graphic representation depicting a state of the instance, said graphic representation comprising graphic symbols representing each of the users; updating the state of the instance and responding to to user requests if said input satisfies a criteria set by the instance's interaction rules; and broadcasting the updated state to all the at least two users operatively connected to the instance; wherein the graphic representation includes specified distances from references to proportionally represent action or nonaction of users.

2. The method of claim 1 wherein the step of defining a social interaction genre includes one of copying and modifying a previously defined interaction genre.

3. The method of claim 1 wherein the step of specifying a graphic representation includes specifying rules of the graphic representation of the genre, including rules specifying how interactions are represented.

4. The method of claim 3 wherein the graphic symbols further represent each user's role.

5. The method of claim 3 wherein the graphic representation includes specified positions representing status of respective users.

6. The method of claim 1 wherein said step of creating an operation instance of a genre includes setting genre parameters.

7. The method of claim 6 wherein said genre parameters include genre roles.

8. The method of claim 6 wherein said genre parameters include rule parameters.

9. The method of claim 1 wherein said input includes one of text messages, audio clips and video clips.

10. The method of claim 3 wherein said input includes the users' change in roles by dragging and dropping of graphics elements of the graphic representation of the state of the instance.

11. The method of claim 1 wherein said users' requests include requesting to ask a question.

12. The method of claim 1 wherein said users' requests include a request for a clarification.

13. The method of claim 1 wherein said step of monitoring includes monitoring the passage of time between inputs by a user.

14. A method of user-defined structured interaction online comprising the step of: defining a social interaction genre for computer-mediated communication between at least two users, wherein said social interaction genre enables a first user to ask a question to a second user, the second user to ask for clarification to the question to the first user, and the second user to answer the question to the first user; creating an operational instance of the genre, said instance being initialized to a predetermined state; monitoring input form the at least two users operatively connected to said instance; updating a state of the instance and executing specified actions in response to enforcement rules; and broadcasting the updated state to all the at least two users operatively connected to the instance; wherein said step of updating the state of the instance and executing specified actions in response to enforcement rules includes modifying an ionic representation of a user violating said rules in a graphic representation of the genre instance.

15. The method of claim 14 wherein said step of updating the state of the instance and executing specified actions in response to enforcement rules includes sending the rule violator a message.

16. The method of claim 14 wherein said step of updating the state of the instance and executing specified actions in response to enforcement rules includes disconnecting a user violating said rules from the current instance.

17. The method of claim 14 wherein said step of updating the state of the instance and executing specified actions in response to enforcement rules includes barring a user violating said rules from future connections for a specified period of time.

18. The method of claim 14 wherein said step of updating the state of the instance in response to interaction rules includes changing the genre of the instance.

19. The method of claim 18 wherein the graphic representation of the instance is changed in response to the changing of its genre.

20. The method of claim 14 wherein said step of updating the state of the instance includes changing one or more genre parameters including genre roles.

21. The method of claim 14 wherein said updating step includes repositioning the icons representing the operative users.

22. The method of claim 1, further including the step of identifying a given user by moving a cursor over the icon representing that user.

23. The method of claim 1 wherein said step of broadcasting the updated state of the instance includes broadcasting the instance's genre rules.

24. The method of claim 20 wherein said updating step includes modifying icons to represent changes in roles of respective users.

25. The method of claim 1 wherein said step of broadcasting the updated state of the instance includes the broadcast of the graphic representation of the state of the instance.

26. The method of claim 22 wherein said updating step includes modifying icons to represent changes in roles of respective users.

27. A computer-based medium having stored programs readable by a computer for causing the computer to execute method steps for facilitating interaction among a plurality of users operatively connected to the computer, the method comprising the steps of: receiving requests from the plurality of users to participate in a computer-mediated social interactive discussion between the users, each of said users represented by a graphic symbol; registering said users by storing user identifications and passwords of respective users; storing said identifications and passwords of respective users; storing said identifications and passwords in a user database; authorizing said users as participants in the interactive discussion and informing the participants of the parameters and rules; monitoring inputs from the participants during the interactive discussion; enforcing penalties upon participants violating said rules; wherein said step of enforcing penalties includes associating violation data with user data of violating participants in the user database.

28. The computer-based medium according to claim 27, wherein said clearance signal is given based on data on users stored in the user database.

29. The computer-based medium according to claim 27, further including the step of modifying said parameters by said participants.

30. The method of claim 1, wherein updating the state of the instance and responding to user requests if said input satisfies a criteria set by the instance's interaction rules comprises updating the state of the instance and responding to user requests if said input satisfies a criteria set by the instance's interaction rules for interacting between the users.

31. The method of claim 14, wherein updating a state of the instance and executing specified actions in response to enforcement rules comprises updating a state of the instance and executing specified actions in response to enforcement rules, said enforcement rules defining which users can communicate at a given time of the instance.

* * * * *